US012574254B2

(12) United States Patent 
Kang

(10) Patent No.: US 12,574,254 B2
(45) Date of Patent: Mar. 10, 2026

(54) SECURE PROGRAMMING SYSTEM AND OPERATING METHOD THEREOF

(71) Applicant: Dediprog Technology Co., Ltd., Taipei City (TW)

(72) Inventor: Ming-Hui Kang, Taipei City (TW)

(73) Assignee: DEDIPROG TECHNOLOGY CO., LTD., Taipei City (TW)

( * ) Notice: Subject to any disclaimer, the term of this patent is extended or adjusted under 35 U.S.C. 154(b) by 232 days.

(21) Appl. No.: 18/397,606

(22) Filed: Dec. 27, 2023

(65) Prior Publication Data

US 2025/0023733 A1 Jan. 16, 2025

Related U.S. Application Data

(60) Provisional application No. 63/525,825, filed on Jul. 10, 2023, provisional application No. 63/525,809, filed on Jul. 10, 2023.

(30) Foreign Application Priority Data

Oct. 31, 2023 (TW) ................................. 112141864
Oct. 31, 2023 (TW) ................................. 112141865

(51) Int. Cl.
*H04L 9/32* (2006.01)
*H04L 9/08* (2006.01)
*H04L 9/30* (2006.01)

(52) U.S. Cl.
CPC ............ *H04L 9/3263* (2013.01); *H04L 9/088* (2013.01); *H04L 9/30* (2013.01); *H04L 9/3226* (2013.01); *H04L 9/3247* (2013.01)

(58) Field of Classification Search
CPC .................................................. H04L 9/3263
See application file for complete search history.

(56) References Cited

U.S. PATENT DOCUMENTS 5,857,022 A * 1/1999 Sudia .................... H04L 9/0894
713/173
9,781,086 B2 * 10/2017 Jelatis ................... H04L 9/3247
(Continued)

FOREIGN PATENT DOCUMENTS

CN 107979467 A 5/2018
CN 108647499 A 10/2018
(Continued)

OTHER PUBLICATIONS

U.S. Office Action for U.S. Appl. No. 18/767,037, dated Oct. 1, 2025.

(Continued)

*Primary Examiner* — Simon P Kanaan
(74) *Attorney, Agent, or Firm* — Birch, Stewart, Kolasch & Birch, LLP

(57) ABSTRACT

An operating method for a secure programming system is provided. Firstly, the programmer encrypts a job control package including a payload. Then, a programmable device is loaded into the programmer. If an authentication code in an authentication list complies with a device identification code of the programmable device, the programmer decrypts the encrypted job control packages so as to extract the payload. Then, the programmer calculates a first verification code according to the payload, and the programmer burns the payload into the programmable device. Then, the programmer reads the burnt payload from the programmable device and calculates a second verification code according to the burnt payload. If the first verification code and the second verification code are verified successfully, the programmable device is categorized into a first output container representing a good output container.

9 Claims, 2 Drawing Sheets

(56) References Cited

U.S. PATENT DOCUMENTS

| | | | | |
|---|---|---|---|---|
| 9,900,310 | B2 * | 2/2018 | Brickell | H04L 63/0876 |
| 10,069,633 | B2 | 9/2018 | Gulati et al. | |
| 10,110,411 | B2 | 10/2018 | Gulati | |
| 10,263,790 | B2 | 4/2019 | Gulati et al. | |
| 11,336,440 | B2 * | 5/2022 | Shpurov | G06Q 30/0226 |
| 11,895,250 | B2 | 2/2024 | Simplicio et al. | |
| 12,132,841 | B2 * | 10/2024 | Smith, III | H04W 12/069 |
| 12,160,516 | B2 * | 12/2024 | Ngo | H04W 12/08 |
| 2004/0117612 | A1 | 6/2004 | Falk | |
| 2005/0076216 | A1 * | 4/2005 | Nyberg | H04L 63/061 |
| | | | | 713/168 |
| 2013/0073856 | A1 | 3/2013 | Sherkin et al. | |
| 2014/0164779 | A1 | 6/2014 | Hartley et al. | |
| 2016/0092701 | A1 | 3/2016 | Shah et al. | |
| 2018/0219857 | A1 | 8/2018 | Bhattacharya et al. | |
| 2019/0052464 | A1 | 2/2019 | Doliwa | |
| 2019/0163909 | A1 | 5/2019 | Schilder et al. | |
| 2019/0188387 | A1 | 6/2019 | Fu et al. | |
| 2019/0273616 | A1 * | 9/2019 | Bres | H04L 9/3236 |
| 2019/0289006 | A1 | 9/2019 | Fang et al. | |
| 2022/0014389 | A1 | 1/2022 | Nix | |
| 2023/0009032 | A1 | 1/2023 | Khatri et al. | |
| 2023/0010345 | A1 | 1/2023 | Khatri et al. | |
| 2023/0185482 | A1 | 6/2023 | Steinmetz et al. | |

FOREIGN PATENT DOCUMENTS

| | | |
|---|---|---|
| CN | 111342955 A | 6/2020 |
| CN | 111611593 A | 9/2020 |
| CN | 114912138 A | 8/2022 |
| CN | 116070215 A | 5/2023 |
| CN | 116257820 A | 6/2023 |
| TW | 201401102 A | 1/2014 |
| TW | 201820132 A | 6/2018 |
| TW | 202207664 A | 2/2022 |
| TW | 202232912 A | 8/2022 |
| TW | I773161 B | 8/2022 |
| WO | WO 2020/052335 A1 | 3/2020 |

OTHER PUBLICATIONS

U.S. Office Action for U.S. Appl. No. 18/397,674, dated Nov. 4, 2025.

U.S. Office Action for U.S. Appl. No. 18/767,037, dated Jan. 20, 2026.

* cited by examiner

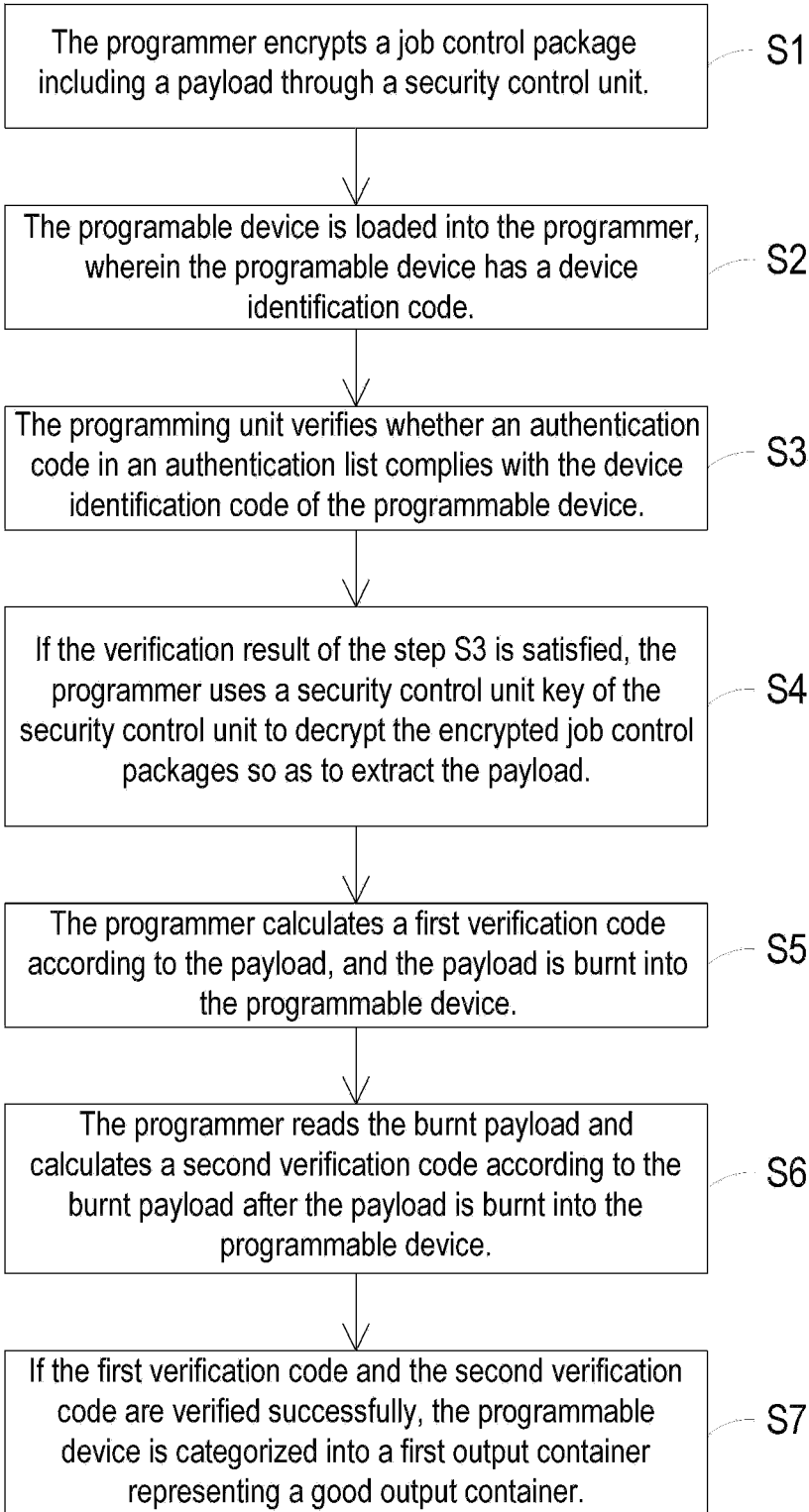

The programmer encrypts a job control package including a payload through a security control unit. — S1

The programable device is loaded into the programmer, wherein the programable device has a device identification code. — S2

The programming unit verifies whether an authentication code in an authentication list complies with the device identification code of the programmable device. — S3

If the verification result of the step S3 is satisfied, the programmer uses a security control unit key of the security control unit to decrypt the encrypted job control packages so as to extract the payload. — S4

The programmer calculates a first verification code according to the payload, and the payload is burnt into the programmable device. — S5

The programmer reads the burnt payload and calculates a second verification code according to the burnt payload after the payload is burnt into the programmable device. — S6

If the first verification code and the second verification code are verified successfully, the programmable device is categorized into a first output container representing a good output container. — S7

FIG. 1

SECURE PROGRAMMING SYSTEM AND OPERATING METHOD THEREOF

CROSS-REFERENCE TO RELATED APPLICATION

This application claims the benefit of U.S. Provisional Application Ser. No. 63/525,825 filed on Jul. 10, 2023, and claims the benefit of U.S. Provisional Application Ser. No. 63/525,809 filed on Jul. 10, 2023. This application claims priority to Taiwan Patent Application No. 112141865 filed on Oct. 31, 2023, and claims priority to Taiwan Patent Application No. 112141864 filed on Oct. 31, 2023. The entire contents of the above-mentioned patent applications are incorporated herein by reference for all purposes.

FIELD OF THE INVENTION

The present invention relates to the technology of a secure programming system, and more particularly to a secure programming system and an operating method for the secure programming system.

BACKGROUND OF THE INVENTION

In the existing burning operations and processes, data are usually burnt into an integrated circuit. However, if the data to be burnt into the integrated circuit are plain texts without encryption protection, the possibility of data leakage increases.

Therefore, it is important to provide a secure programming system and an operating method for the secure programming system for the secure programming system.

SUMMARY OF THE INVENTION

The present invention provides a secure programming system and an operating method for the secure programming system. The secure programming system and the operating method are employed to encrypt and protect the payload of the job control package. If the authentication code in an authentication list complies with the device identification code of a programmable device, the payload is burnt into the programmable device. As a consequence, the problem of causing the data leakage is avoided, and the data security is enhanced.

In accordance with an aspect of the present invention, an operating method for a secure programming system is provided. The secure programming system includes a programmer. The operating method includes the following steps. In a step (S1), the programmer encrypts a job control package including a payload through a security control unit. In a step (S2), a programmable device is loaded into the programmer, wherein the programmable device has a device identification code. In a step (S3), a verifying process is performed to verify whether an authentication code in an authentication list complies with the device identification code of the programmable device. In a step (S4), when the authentication code in the authentication list complies with the device identification code of the programmable device, the programmer uses a security control unit key of the security control unit to decrypt the encrypted job control packages so as to extract the payload. In a step (S5), the programmer calculates a first verification code according to the payload, and the programmer burns the payload into the programmable device. In a step (S6), the programmer reads the burnt payload from the programmable device and calculates a second verification code according to the burnt payload after the payload is burnt into the programmable device. In a step (S7), the programmer verifies the first verification code and the second verification code. When the first verification code and the second verification code are verified successfully, the programmable device is categorized into a first output container representing a good output container.

In accordance with another aspect of the present invention, a secure programming system is provided. The secure programming system includes a programmer and a programming unit. The programmer encrypts a job control package including a payload through a security control unit. A programmable device is loaded into the programmer. The programmer uses a security control unit key of the security control unit to decrypt the encrypted job control packages so as to extract the payload. The programmer calculates a first verification code according to the payload and performs a burning task of burning the payload into a programmable device. After the payload is burnt into the programmable device, the programmer reads the burnt payload and calculates a second verification code according to the burnt payload. When the first verification code and the second verification code are verified successfully, the programmable device is categorized into a first output container representing a good output container. The programming unit is connected with the programmer. The programming unit extracts the job control package with the payload and verifies whether an authentication code in an authentication list complies with a device identification code of the programmable device. When the authentication code in the authentication list complies with the device identification code of the programmable device, the programming unit issues a successful authentication message to the programmer. After the programmer receives the successful authentication message, the programmer uses the security control unit key of the security control unit to decrypt the encrypted job control packages so as to extract the payload.

The above contents of the present invention will become more readily apparent to those ordinarily skilled in the art after reviewing the following detailed description and accompanying drawings, in which:

BRIEF DESCRIPTION OF THE DRAWINGS

FIG. 1 illustrates a flowchart of an operating method for the secure programming system according to an embodiment of the present invention.

DETAILED DESCRIPTION OF THE PREFERRED EMBODIMENT

Figure 2:
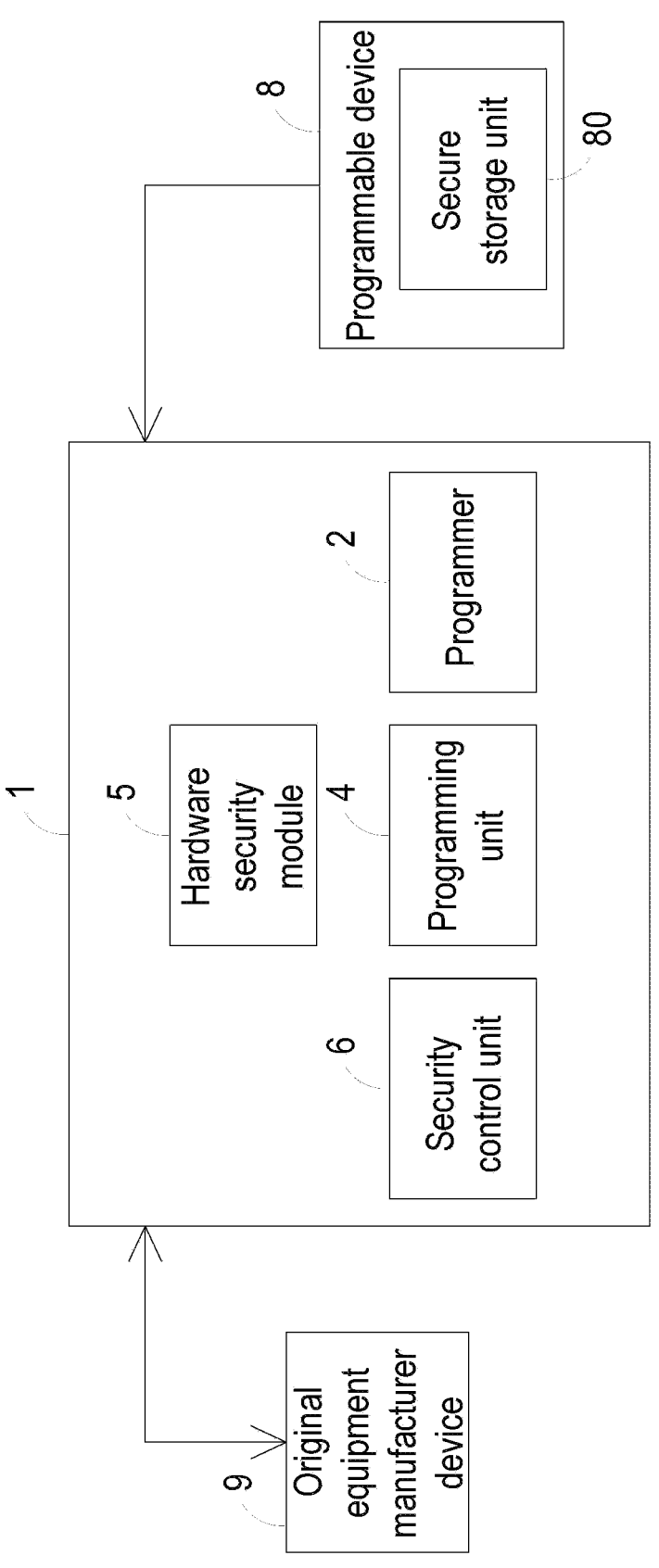
FIG. 2 schematically illustrates the architecture of a secure programming system using the operating method of FIG. 1.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Please refer to FIGS. 1 and 2. FIG. 1 illustrates a flowchart of an operating method for the secure programming system according to an embodiment of the present invention. FIG. 2 schematically illustrates the architecture of the secure programming system using the operating method of FIG. 1.

The present invention provides an operating method for the secure programming system 1. That is, the operating method is applied to the secure programming system 1.

The secure programming system 1 is in communication with an original equipment manufacturer (OEM) device 9.

The secure programming system 1 can individually encrypt a target payload of data and code and then program the information into at least one programmable device 8. For example, the programmable device includes an integrated circuit, a memory chip, a circuit board, or an electronic device (e.g., a smart phone, a media player, or any other appropriate consumer and industrial electronic device). The secure programming system 1 can create a customized payload package that can only be decrypted by a system or device having the correct security keys.

The secure programming system 1 includes a programmer 2 and a programming unit 4. The programmer 2 is an electromechanical system for physically programming the programmable device 8. The programmable device 8 can be loaded into or installed in the programmer 2.

The programming unit 4 can extract a job control package. The job control package includes a payload. In addition, the programming unit 4 verifies whether an authentication code in an authentication list complies with the device identification code of the programmable device 8. If the authentication code in the authentication list complies with the device identification code of the programmable device 8, the programming unit 4 issues a successful authentication message to the programmer 2. After the programmer 2 receives the successful authentication message, the payload from the programming unit 4 is provided to the programmable device 8 through the programmer 2.

In some embodiments, the secure programming system 1 further includes a security control unit 6. The security control unit 6 uses a programmer public key, an OEM public key, a hardware security module public key, a silicon vendor public key or a security control unit public key to encrypt the payload. In addition, the security control unit 6 generates the job control package with the payload through the encryption format. In an embodiment, the security control unit 6 is a computing device for processing security information. The security control unit 6 includes specific cryptographic and computational hardware to facilitate the processing of cryptographic information. For example, the security control unit 6 includes a quantum computer, a parallel computing circuit system, a field-programmable gate array (FPGA) configured to process security information, a co-processor, an array logic unit, a microprocessor, or a combination thereof. Moreover, the security control unit 6 can be specifically configured as a security device to prevent unauthorized access to security information at the input, intermediate, or final stages of processing security information.

In an embodiment, the operating method includes the following steps.

In a step S1, a job control package including a payload is encrypted by the programmer 2 through the security control unit 6. In an embodiment, a serial number list about programmer 2 and the payload are placed into the job control package by the original equipment manufacturer device 9. Then, the job control package is encrypted according to a security control unit key that is generated randomly by the security control unit 6. In addition, a hardware security module public key is loaded to encrypt the security control unit key. Afterwards, the encrypted job control package, the encrypted security control unit key, an authentication list and the hardware security module public key are transmitted to the programming unit 4, wherein the authentication list includes an authentication code.

In a step S2, the programmable device 8 is loaded into the programmer 2. The programmable device 8 has a device identification code.

In a step S3, the programming unit 4 verifies whether the authentication code in the authentication list complies with the device identification code of the programmable device 8.

If the verification result of the step S3 indicates that the authentication code in the authentication list complies with the device identification code of the programmable device 8, a step S4 is performed. In the step S4, the programmer 2 uses a security control unit key of the security control unit 6 to decrypt the encrypted job control packages so as to extract the payload.

In a step S5, the programmer 2 calculates a first verification code according to the payload, and the payload is burnt into the programmable device 8.

In a step S6, the programmer 2 reads the burnt payload and calculates a second verification code according to the burnt payload after the payload is burnt into the programmable device 8.

In a step S7, the programmer 2 verifies the first verification code and the second verification code. If the verification result is successful, the programmable device 8 is categorized into a first output container representing a good output container.

From the above descriptions, the operating method of the present invention can encrypt and protect the job control package with the payload. After the programming unit 4 determines that the authentication code in the authentication list complies with the device identification code of the programmable device 8, the payload is burnt into the programmable device 8. As a consequence, the problem of causing the data leakage is avoided, and the data security is enhanced.

In some embodiments, the step S1 further includes a sub-step of extracting the payload from a secure storage unit 80 of the programmable device 8.

In another embodiment, the operating method further includes a step S8 (not shown) and a step S9 (not shown). The step S8 and the step S9 are performed before the step S1. In the step S8, the job control package is generated. The job control package includes a programmer identification list. The programmer identification list records at least one programmer 2 capable of performing the burning task. In the step S9, at least one programmer 2 recorded in the programmer identification list is used to program the payload in the job control package into the programmable device 8.

In some embodiments, if the verification result of the step S7 is not successful, the programmable device 8 is categorized into a second output container, representing a bad output container. In an embodiment, the first output container and the second output container are separate carrying trays.

In some embodiments, the step S7 further includes a sub-step of using a device transfer unit (not shown) to move the programmable device 8 into the first output container or the second output container. Preferably but not exclusively, the device transfer unit is a robotic arm of an automation equipment.

In some embodiments, the programming unit 4 extracts a firmware image from the payload. For example, the firmware image is an image file or a code of the programming language. In addition, the firmware image is decrypted by the programming unit 4. After the programmer 2 receives the decrypted firmware image from the programming unit 4, the decrypted firmware image is copied to the programmable device 8.

In some embodiments, the programming unit 4 retrieves the corresponding unique serial numbers from one or more programmers 2. These unique serial numbers are integrated into a serial number list. The serial number list is transmitted to the original equipment manufacturer device 9.

In some embodiments, the secure programming system 1 further includes a hardware security module (HSM) 5. The hardware security module 5 generates a hardware security module public key and a hardware security module private key by using the asymmetric encryption algorithm. The hardware security module public key and the hardware security module private key match each other. Furthermore, the hardware security module 5 sets the burn count that can be used with the corresponding hardware security module public key. The hardware security module private key is stored within the hardware security module 5. In addition, the hardware security module public key can be transmitted to the original equipment manufacturer device 9 through the security control unit 6.

In the step S3, the programming unit 4 reads the device identification code of the programmable device 8 through the programmer 2. In addition, the programming unit 4 determines whether the authentication code in the authentication list complies with the device identification code of the programmable device 8. If the verification result is successful, the programming unit 4 transmits the hardware security module public key to the hardware security module 5 and requests the hardware security module 5 to provide the corresponding usable burn count. The usable burn count is transmitted from the hardware security module 5 to the programming unit 4.

Furthermore, according to the usable production count, the programming unit 4 determines whether the burning task is continuously performed by the programmer 2. If the usable production count is 0, the burning task is stopped. Whereas, if the usable production count is not 0, the programming unit 4 deducts the usable production count by a pre-withheld production count. For example, the pre-withheld production count is at least one. However, if the pre-withheld production count exceeds the usable production count, the upper limit of the usable production count is served as the pre-withheld production count by the programming unit 4. Then, the pre-withheld production count is stored in the programming unit 4. Furthermore, the remaining usable production count after deducting the pre-withheld production count is transmitted from the programming unit 4 to the hardware security module 5 for storage. In other words, the programming unit 4 is configured to confirm the stored production count. If the burn count in the programmer 2 is less than the production count, the programmer 2 is driven to perform the burning task by the programming unit 4. Whereas, if the burn count in the programmer 2 exceeds the production count, the programmer 2 is still driven to perform the burning task. However, the burn count in the programmer 2 may at most reach the upper limit of the usable production count.

In some embodiments, the encrypted job control package is transmitted from the programming unit 4 to the programmer 2 and stored in a random-access memory (not shown) of the programmer 2. Then, the encrypted job control package in programming unit 4 is erased.

In some embodiments, the programming unit 4 acquires a serial number list from the identification list. If the serial number list is successfully verified and the authentication code in the authentication list complies with the device identification code of the programmable device 8, the programming unit 4 provides the payload to the programmable device 8.

In some embodiments, the encrypted security control unit key and the hardware security module public key are transmitted from the programming unit 4 to the hardware security module 5 for decryption. After the programming unit 4 receives the decrypted security control unit key from the hardware security module 5, the decrypted security control unit key is transmitted to the random-access memory of the programmer 2 to decrypt the encrypted job control package. Afterwards, the programmer 2 extracts the payload from the decrypted job control package and then extracts the serial number list matching the serial number of the programmer 2. If the serial number is not included in the serial number list, the burning task is stopped. If the serial number is included in the serial number list, the burning task is performed continuously and the decrypted payload read by the programmer 2 is burnt into the programmable device 8.

In some embodiments, the programmer 2 further reads the data from the programmable device 8, and then the data is temporarily stored in the random-access memory. Then, the decrypted payload temporarily stored in the random-access memory is used to verify the data of the programmable device 8. In addition, the programmer 2 transmits the verification result to the programming unit 4, and the data temporarily stored in the random-access memory is erased. According to the verification result from the programmer 2, the programming unit 4 determines whether the verification result is successful. If the verification result is successful, the programming unit 4 deducts the stored pre-production count by 1. If the verification result is not successful, the pre-production count is not changed. If the pre-production count of the programming unit 4 is 0, the programming unit 4 checks the corresponding production count through the hardware security module 5. Consequently, the usable production count is transmitted from the hardware security module 5 to the programming unit 4. If the usable production count is 0, the burning task is stopped. Whereas, if the usable production count is not 0, the programming unit 4 deducts the usable production count by a pre-withheld production count. For example, the pre-withheld production count is at least one. In addition, the pre-withheld production count is stored in the programming unit 4. Furthermore, the remaining usable production count after deducting the pre-withheld production count is transmitted from the programming unit 4 to the hardware security module 5 for storage.

From the above descriptions, the present invention provides a secure programming system and an operating method for the secure programming system. The secure programming system and the operating method are employed to encrypt and protect the payload of the job control package. After the programming unit determines that an authentication code in an authentication list complies with the device identification code of the programmable device, the payload is burnt into the programmable device. As a consequence, the problem of causing the data leakage is avoided, and the data security is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An operating method for a secure programming system, the secure programming system comprising a programmer, the operating method comprising steps of:

(S1) the programmer encrypting a job control package including a payload through a security control unit;

(S2) loading a programmable device into the programmer, wherein the programmable device has a device identification code;

(S3) verifying whether an authentication code in an authentication list complies with the device identification code of the programmable device;

(S4) when the authentication code in the authentication list complies with the device identification code of the programmable device, the programmer using a security control unit key of the security control unit to decrypt the encrypted job control packages so as to extract the payload;

(S5) the programmer calculating a first verification code according to the payload, and burning the payload into the programmable device;

(S6) the programmer reading the burnt payload from the programmable device and calculating a second verification code according to the burnt payload after the payload is burnt into the programmable device; and (S7) the programmer verifying the first verification code and the second verification code, wherein when the first verification code and the second verification code are verified successfully, the programmable device is categorized into a first output container representing a good output container.

2. The operating method according to claim 1, wherein in the step (S1), the payload is extracted from a secure storage unit of the programmable device.

3. The operating method according to claim 1, wherein in the step (S7), when the first verification code and the second verification code are not verified successfully, the programmable device is categorized into a second output container representing a bad output device.

4. The operating method according to claim 1, wherein before the step S1, the operating method further comprises steps of:

(S8) generating the job control package, wherein the control package includes a programmer identification list, and the programmer identification list records at least one programmer capable of performing the burning task; and (S9) using at least one programmer recorded in the programmer identification list to program the payload in the job control package into the programmable device.

5. A secure programming system, comprising:

a programmer encrypting a job control package including a payload through a security control unit, wherein a programmable device is loaded into the programmer, the programmer uses a security control unit key of the security control unit to decrypt the encrypted job control packages so as to extract the payload, and the programmer calculates a first verification code according to the payload and performs a burning task of burning the payload into a programmable device, wherein after the payload is burnt into the programmable device, the programmer reads the burnt payload and calculates a second verification code according to the burnt payload, wherein when the first verification code and the second verification code are verified successfully, the programmable device is categorized into a first output container representing a good output container;

a programming unit connected with the programmer, wherein the programming unit extracts the job control package with the payload and verifies whether an authentication code in an authentication list complies with a device identification code of the programmable device, wherein when the authentication code in the authentication list complies with the device identification code of the programmable device, the programming unit issues a successful authentication message to the programmer, wherein after the programmer receives the successful authentication message, the programmer uses the security control unit key of the security control unit to decrypt the encrypted job control packages so as to extract the payload.

6. The secure programming system according to claim 5, wherein the programmer extracts the payload from a secure storage unit of the programmable device.

7. The secure programming system according to claim 5, wherein the programmer transfers the programmable device into the first output container through a device transfer unit.

8. The secure programming system according to claim 5, wherein the security control unit generates the job control package including a programmer identification list, wherein the programmer identification list records at least one programmer capable of performing the burning task, and the at least one programmer recorded in the programmer identification list is used to program the payload in the job control package into the programmable device.

9. The secure programming system according to claim 5, wherein the programming unit acquires a production count, wherein when a burn count in the programmer is less than the production count, the programming unit drives the programmer to perform the burning task, wherein when the burn count in the programmer exceeds the production count, the programming unit drives the programmer to perform the burning task, but the burn count in the programmer is smaller than or equal to an upper limit of the production count.

* * * * *